(12) United States Patent
Hell et al.

(10) Patent No.: US 10,794,829 B2
(45) Date of Patent: Oct. 6, 2020

(54) METHOD OF AND APPARATUS FOR SPATIALLY MEASURING NANO-SCALE STRUCTURES

(71) Applicant: Max-Planck-Gesellschaft zur Foerderung der Wissenschaften e.V., Munich (DE)

(72) Inventors: Stefan W. Hell, Goettingen (DE); Yvan Eilers, Goettingen (DE); Klaus Gwosch, Goettingen (DE); Francisco Balzarotti, Goettingen (DE)

(73) Assignee: MAX-PLACK-GESELLSCHAFT ZUR FOERDERUNG DER WISSENSCHAFTEN E.V., Munich (DE)

(*) Notice: Subject to any disclaimer, the term of this patent is extended or adjusted under 35 U.S.C. 154(b) by 115 days.

(21) Appl. No.: 15/912,928

(22) Filed: Mar. 6, 2018

(65) Prior Publication Data
US 2018/0259458 A1    Sep. 13, 2018

(30) Foreign Application Priority Data

Mar. 7, 2017 (DE) .......................... 10 2017 104 736
Jul. 20, 2017 (EP) ..................................... 17182455

(51) Int. Cl.
*G01J 3/30* (2006.01)
*G01N 21/64* (2006.01)
*G02B 21/00* (2006.01)

(52) U.S. Cl.
CPC ....... *G01N 21/6456* (2013.01); *G01N 21/643* (2013.01); *G01N 21/6458* (2013.01);
(Continued)

(58) Field of Classification Search
CPC ............. G01N 21/6456; G01N 21/643; G01N 21/6458; G01N 2021/6419;
(Continued)

(56) References Cited

U.S. PATENT DOCUMENTS 9,267,888 B2    2/2016  Hell et al.
2010/0210475 A1  8/2010  Lee
(Continued)

FOREIGN PATENT DOCUMENTS

DE    10 2016 117 096 A1    3/2017
DE    10 2016 119 262 A1    4/2018
(Continued)

OTHER PUBLICATIONS

Balzaroth F, Eilers Y, Gwosch KC, Gynnå AH, Westphal V, Stefani FD, Elf J, Hell SW: Nanometer resolution imaging and tracking of fluorescent molecules with minimal photon fluxes, Science 355; published online Dec. 22, 2016.
(Continued)

*Primary Examiner* — Tarifur R Chowdhury
*Assistant Examiner* — Jonathon Cook
(74) *Attorney, Agent, or Firm* — Thomas | Horstemeyer, LLP

(57) ABSTRACT

A method of spatially measuring a plurality of nano-scale structures in a sample comprises the steps of: marking the individual structures at different locations with fluorescent markers, coupling the individual structures to individual positioning aids whose positions in the sample are known, exciting the fluorescent markers with excitation light for emission of fluorescence light, wherein an intensity distribution of the excitation light has a local minimum, arranging the local minimum at different positions in a close-up range around the position of respective positioning aid whose dimensions are not larger than the diffraction limit at the
(Continued)

wavelength of the excitation light, registering the fluorescence light emitted out of the sample separately for the individual fluorescent markers and for the different positions of the minimum, and determining positions of the individual fluorescent markers in the sample from the intensities of the fluorescence light registered.

26 Claims, 8 Drawing Sheets

(52) U.S. Cl.
CPC ..... *G02B 21/0036* (2013.01); *G02B 21/0076* (2013.01); *G01N 2021/6419* (2013.01); *G01N 2021/6421* (2013.01); *G01N 2021/6441* (2013.01)

(58) Field of Classification Search
CPC ... G01N 2021/6421; G01N 2021/6441; G02B 21/0036; G02B 21/0076
See application file for complete search history.

(56) References Cited

U.S. PATENT DOCUMENTS

2016/0124208 A1* 5/2016 Best .................. G02B 21/0076 359/363
2017/0082844 A1 3/2017 Hell et al.

FOREIGN PATENT DOCUMENTS

| | | |
|---|---|---|
| DE | 10 2016 119 263 A1 | 4/2018 |
| DE | 10 2016 119 264 A1 | 4/2018 |
| WO | 2014/108455 A1 | 7/2014 |
| WO | 2017/153430 A1 | 9/2017 |

OTHER PUBLICATIONS

Göttfert F, Pleiner T, Heine J, Westphal V, Görlich D, Sahl SJ, Hell SW: Strong signal increase in STED fluorescence microscopy by imaging regions of subdiffraction extent, PNAS vol. 114 No. 9, Feb. 28, 2017.

Danzl JG, Sidenstein SC, Gregor C, Urban NT, Ilgen P, Jakobs S, Hell SW: Coordinate-targeted fluorescence nanoscopy with multiple off states, Nature Photonics vol. 10, Feb. 2016.

Balzarotti, Francisco et al.: "Nanometer resolution imaging and tracking of fluorescent molecules with minimal photon fluxes", Science 355, pp. 606-612, XP055426923, ISSN: 0036-8075, Feb. 10, 2017.

European Search Report in co-pending, related EP Application No. 18157683.6, dated May 4, 2018.

* cited by examiner (a)

(b)

(c)

(d)

(a)

(b)

METHOD OF AND APPARATUS FOR SPATIALLY MEASURING NANO-SCALE STRUCTURES

CROSS REFERENCE

This application claims priority to German patent application DE 10 2017 104 736.0 filed Mar. 7, 2017 and entitled "Verfahren and Vorrichtung zum räumlichen Messen nanoskaliger Strukturen" and to European patent application EP 17 182 455.0 filed Jul. 20, 2017 and entitled "Verfahren zum räumlichen Messen einer nanoskaligen Struktur".

FIELD

The present invention relates to methods of spatially measuring at least one nano-scale structure in a sample and to an apparatus for carrying out such methods.

Particularly, the method includes the steps of marking the at least one nano-scale structure at different locations with fluorescent markers, exciting the fluorescent markers with excitation light for emission of fluorescence light, registering the fluorescence light emitted out of the sample, and determining positions of the individual fluorescent markers in the sample from the registered intensities of the fluorescence light.

Even more particular, the present invention relates to a method in which the determination of the position of the individual fluorescent markers in the sample takes place at a precision beyond the diffraction limit at the wavelength of the excitation light and at the wavelength of the fluorescence light.

BACKGROUND

A method of spatially measuring at least one nano-scale structure in a sample, in which the position of an individualized fluorescent marker in the sample is determined at a precision beyond the diffraction limit at the wavelength of the excitation light and at the wavelength of the fluorescence light, is known as MINFLUX microscopy, see Balzarotti F, Eilers Y, Gwosch K C, Gynnå A H, Westphal V, Stefani F D, Elf J, Hell S W: Nanometer resolution imaging and tracking of fluorescent molecules with minimal photon fluxes, Science 355; published online Dec. 22, 2016. In MINFLUX microscopy, the position of the individualized fluorescent marker is determined in that a zero point of an intensity distribution of excitation light is arranged at a center of a measurement area around an estimated position of the individualized fluorescent marker and at three positions uniformly distributed around the center at a border of the measurement area. At these overall four positions of the zero point, the intensity of the fluorescence light from the respective fluorescent marker is measured separately, and the position of the individualized fluorescent marker is determined from the intensities of the fluorescence light from the respective fluorescent marker separately registered for the different positions of the zero point. The tighter the four positions of the zero point are arranged but nevertheless span the sought-after position of the respective fluorescent marker, the more precisely the position of the fluorescent marker can be determined from just a few photons of the fluorescence light, which are registered for each of the positions of the zero point.

In so-called drug screening and other methods in which a plurality of substances are searched for whether they include substances with particular properties with regard to other substances or biological objects, the substances are each contacted several times with the other substances or with several copies of the objects, and the resulting reactions of the other substances or objects are monitored. The overall number of the reactions to be monitored typically amounts to a plurality of the number of the substances to be searched as several identical pairs are necessary to get statistically significant results and as, on the other hand, the substances often should show the desired properties with regard to different other substances or different biological objects. Generally, systematically ascertaining such a high number of reactions is laborious. Often, reactions on a molecular level may also only be ascertained by means of analytical reactions. Monitoring reaction dynamics is thus often not possible at all.

WO 2014/108455 A1 (corresponding to U.S. Pat. No. 9,267,888 B2) discloses a method of spatially high resolution imaging a structure of a sample marked with fluorescent markers, in which the sample, like in STED fluorescence microscopy, is subjected to excitation light and to stimulation light as fluorescence inhibition light to delimit the area of the sample, to which fluorescence light emitted out of the sample and detected may be assigned, to the area of a zero point of the stimulation light. To protect the fluorescent markers against the high intensities of the stimulation light in the area of its intensity maxima neighboring the zero point, the sample is additionally subjected to excitation inhibition light whose intensity distribution has a local minimum which coincides with the zero point of the stimulation light. This excitation inhibition light may particularly be switch-off light which switches switchable fluorescent markers outside the minimum of the excitation inhibition light off into an inactive state in which they cannot be excited by the excitation light for emission of fluorescence light. Particularly, the fluorescent markers may be switchable fluorescent dyes as they are used in high resolution RESOLFT fluorescence microscopy.

DE 10 2016 117 096 A1 (corresponding to U.S. Pat. No. 2017 0082844 A1) discloses a method of spatially high resolution imaging a structure of a sample marked with fluorescent markers, which also is a method of STED fluorescence microscopy in which the sample besides excitation light is subjected to stimulation light as fluorescence inhibition light to reduce the area of the sample to which fluorescence light emitted out of the sample and registered may be assigned is limited to an area of a zero point of the stimulation light. To protect the fluorescent marker against high intensities of the stimulation light in the area of intensity maxima neighboring the zero point and the resulting dangers of a photochemical bleaching, the zero point is only arranged within a close-up range in the sample whose dimensions are significantly smaller than a distance of these intensity maxima. Additionally, the sample, outside the close-up range, may be subjected to switch-off light, which switches switchable fluorescent markers outside the close-up range off into an inactive state in which they are not excitable for emission of fluorescence light by means of the excitation light. Particularly, these fluorescent markers may be switchable fluorescent markers as they are used in high resolution RESOLFT fluorescence microscopy.

There still is a need of a method by which at least one nano-scale structure can be measured quickly, even repeatedly, to record reactions of the nano-scale structure to altered surrounding conditions as it is, for example, required in the context of a drug screening in which the altered surrounding conditions are due to adding one of the substances to be searched.

SUMMARY OF THE INVENTION

The present invention relates to a method of spatially measuring a plurality of nano-scale structures in a sample. The method comprises the steps of: marking the individual structures at different locations with fluorescent markers, exciting the fluorescent markers with excitation light for emission of fluorescence light, wherein either an intensity distribution of the excitation light or an intensity distribution of further light which has an influence on the emission of fluorescence light by the fluorescent markers comprises a local minimum which is arranged at different positions in the sample, registering fluorescence light emitted out of the sample separately both for the individual fluorescent markers and for the different positions of the minimum, and determining positions of the individual fluorescent markers in the sample from intensities of the fluorescence light registered for the respective fluorescent marker for the different positions of the minimum. The method comprises the further step of coupling the individual structures to individual positioning aids whose positions in the sample are known or determined after the step of coupling from light reflected by the positioning aids. Further, the step of exciting includes arranging the local minimum at the different positions in a close-up range around the position of the respective positioning aid, dimensions of the close-up range not being larger than the diffraction limit at the wavelength of the excitation light and the wavelength of the fluorescence light.

The present invention also relates to an apparatus for spatially measuring a plurality of nano-scale structures in a sample, wherein each of the structures is coupled to a positioning aid whose position in the sample is known or determined from light reflected by the positioning aids. The apparatus comprises a sample holder for the sample, an objective lens directed onto the sample holder, a light source either coupling excitation light into the objective lens in such a way that an intensity distribution of the excitation light focused by the objective lens comprises a local minimum or coupling excitation light and further light that has an influence on the emission of fluorescence light by the fluorescent markers into the objective lens in such a way that an intensity distribution of the further light focused by the objective lens comprises a local minimum, a scanner configured to move a position of the minimum with regard to the sample holder, a detector configured to register fluorescence light emitted out of the sample separately for the different positions of the minimum, an evaluation unit configured to determine positions of individual fluorescent markers in the sample from the intensities of the fluorescence light registered for the respective fluorescent marker for the different positions of the minimum, and a controller configured to arrange the local minimum at different positions in a close-up range around the position of the respective positioning aid, dimensions of the close-up range not being larger than the diffraction limit at the wavelength of the excitation light and the wavelength of the fluorescence light.

The present invention also relates to a method of spatially measuring a nano-scale structure in a sample. The method comprises the steps of marking the structure at different locations with fluorescent markers, exciting the fluorescent markers with excitation light for emission of fluorescence light at the respective position of a local minimum of an intensity distribution of fluorescence inhibition light, wherein the local minimum is arranged at different positions in a close-up range in the sample whose dimensions are not larger than the diffraction limit at the wavelength of the excitation light and the wavelength of the fluorescence light, separately registering the fluorescence light emitted out of the sample for the individual fluorescent markers and for the different positions of the minimum, and determining positions of the individual fluorescent markers in the sample from the intensities of the fluorescence light registered for the respective fluorescent marker for the different positions of the minimum.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
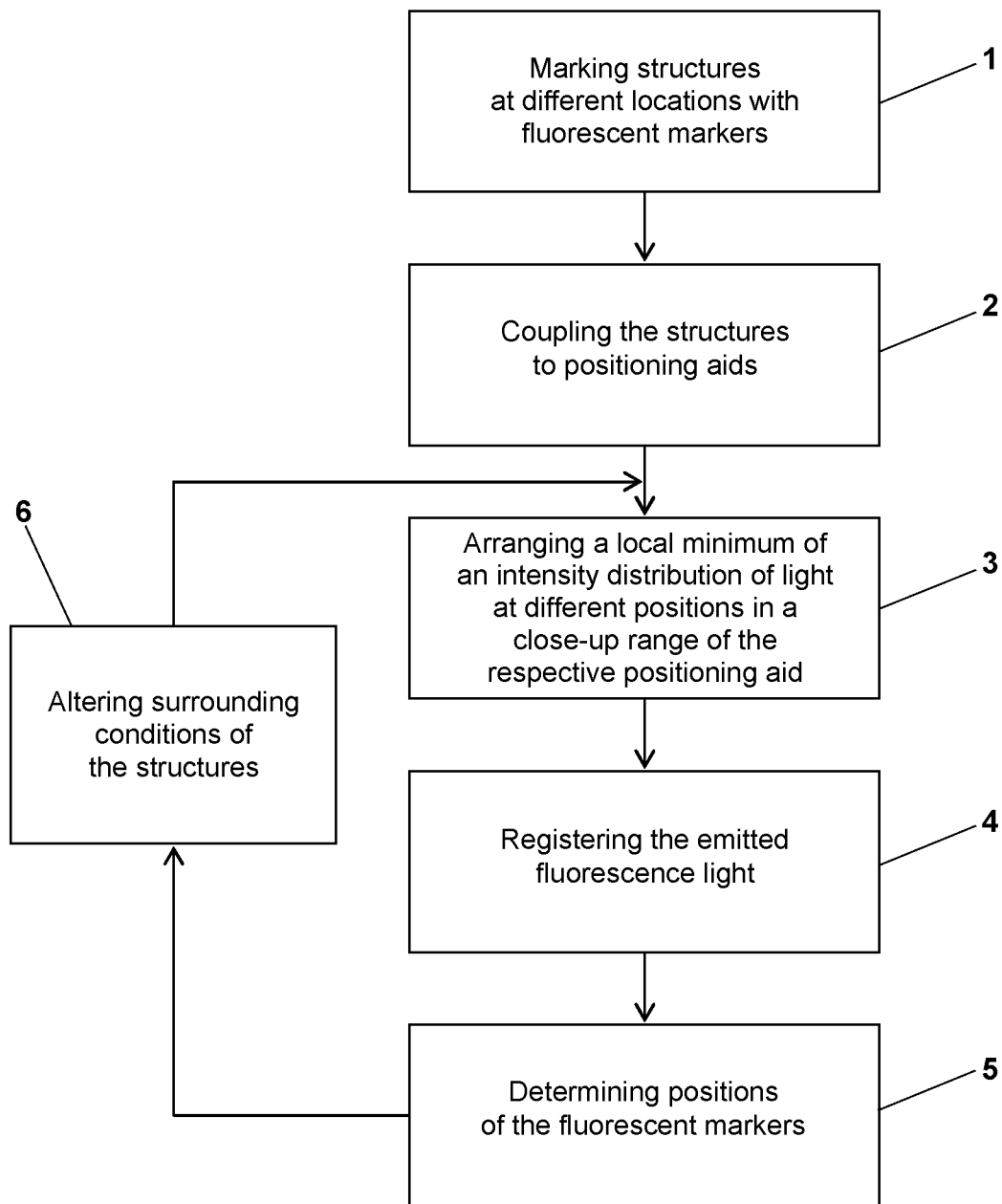
FIG. 1 is a flowchart of an embodiment of the method according to the invention.

A method according to the invention of spatially measuring a plurality of nano-scale structures in a sample comprises the partially overlapping steps of marking, coupling, exciting, arranging, registering and determining.

The fact that nano-scale structures are measured in the method according to the invention means that these structures have nano-scale dimensions of at maximum 200 nm, often of at maximum 100 nm and often times of at maximum 50 nm or only 30 nm.

In the step of marking, the individual structures are marked at different positions with fluorescent markers. This means that each structure which is measured according to the invention is marked with at least two fluorescent markers which are attached to the structure at different positions. For particularly quickly measuring the structures, the number of the fluorescent markers by which each structure is marked may purposefully be kept small, and it may, for example, be limited to not more than 10 or 5. Preferably, all equal structures are marked at equal positions with an equal number of fluorescent markers. The fluorescent markers that are attached to the structure at different positions may be equal or different.

In the step of coupling, the individual structures are coupled to individual positioning aids. This means that each structure which is measured according to the method according to the invention is coupled to one positioning aid. These positioning aids are positioning aids whose positions in the sample are already known because the positioning aids have purposefully been arranged at these positions in the production or preparation of the sample or because their fixed positions in the sample have in some way already been determined prior to the step of coupling. Alternatively or additionally, the positions of the positioning aids in the sample may be determined continuously and thus also even after the step of coupling from light which is reflected by the positioning aids. With their maximum dimensions indicated above, the nano-scale structures, if coupled at one of their ends, do not extend from the position of the respective positioning aid over essentially more than 200 nm, 100 nm, 50 nm or 30 nm and, with a preferred central coupling, not over essentially more than 100 nm, 50 nm, 25 nm or 15 nm.

In the step of exciting, the fluorescent markers by which the structures to be measured are marked are excited by excitation light for emission of fluorescence light. Here, an intensity distribution of the excitation light or an intensity distribution of further light, which has an influence on the emission of fluorescence light by the fluorescent markers, has a local minimum which is arranged at different positions in the sample in the step of exciting. The local minimum may be a true zero point of the respective intensity distribution, in which the intensity of the excitation light or of the further light actually goes down to zero. In any case, only a low remaining intensity of the excitation light or of the further light is desired in the local minimum. In all spatial directions in which the structures are measured in the method according to the invention, the local minimum is delimited by maxima of the respective intensity distribution.

In the step of arranging, which executes the step of exciting in a special manner, the local minimum is arranged at different positions in a close-up range around the known position of the respective positioning aid. The dimensions of this close-up range are not larger than the diffraction limit at the wavelength of the excitation light and the wavelength of the fluorescence light. Even if the positions of the individual positioning aids in the sample are fixed and generally known, approaching these positions or the close-up ranges extending around them with the local minimum may be supported or even completely controlled by means of light reflected by the positioning aids.

In the step of registering, the fluorescence light emitted out of the sample is separately registered both for the individual fluorescent markers and for the different positions of the minimum in the sample. Thus, the registered fluorescence light may respectively be assigned both to a particular fluorescent marker and to a particular position of the minimum in the sample.

Thus, in a step of determining, it is possible to determine the positions of the individual fluorescent markers in the sample from the intensities of the fluorescence light registered for the respective fluorescent marker for the different positions of the minimum based on just a small number of photons of the fluorescence light from the respective fluorescent marker.

Measuring structures only marked with few fluorescent markers particularly means measuring distances between the positions of the fluorescent markers at the structures.

In the method according to the invention, the close-up range around the position of the positioning aid can be systematically approached with the minimum of the intensity distribution of the excitation light or of the further light, because the position of the positioning aid is known from the beginning or determined without the need of emission of photons of the fluorescence light from the fluorescent markers. Thus, in the method according to the invention, each individual structure is measured by means of the fluorescent markers using a previous knowledge of the position of the individual fluorescent markers. Due to coupling the structures of interest to the positioning aids, each structure and thus also the fluorescent markers depending thereon are in the direct neighborhood of a positioning aid. Thus, when the close-up range around this positioning aid is approached with the minimum of the light intensity distribution of the excitation light or the further light, this minimum is already close to the respective fluorescent marker. The more precisely the position of the positioning aid is known, the smaller the close-up range may be within which the minimum of the light intensity distribution of the excitation light or the further light is arranged at different positions to determine the position of the respective fluorescent marker.

According to the invention, the dimensions of the close-up range are not larger than the diffraction limit at the wavelength of the excitation light and the wavelength of the fluorescence light, and the close-up range is scanned by arranging the local minimum at different positions within the close-up range, i.e. the close-up range is partitioned so that the positions of the fluorescent markers can be determined at a spatial resolution of a fraction of the dimensions of the close-up range. Preferably, the dimensions of the close-up range within which the local minimum is arranged at different positions around the position of the respective positioning aid is not larger than a half and even more preferred not larger than a quarter of the diffraction limit at the wavelength of the excitation light and the wavelength of the fluorescence light. This implies that the position of the respective positioning aid has to be known or determined at an even higher precision.

In the method according to the invention, the steps of exciting, registering and determining may be repeated at least once with an increased intensity of the light comprising the local minimum and, preferably, with correspondingly smaller dimensions of the close-up range. The smaller close-up range may be arranged around the position of the respective fluorescent marker determined with the prior intensity of the excitation light or of the further light whose intensity distribution has the local minimum. In this way, the precision of the position determination may be increased iteratively.

The embodiment of the method according to the invention in which the intensity distribution of the excitation light has the local minimum may be realized as an embodiment of the known MINFLUX microscopy. In the other embodiment of the method according to the invention in which the intensity distribution of the further light which has an influence on the emission of the fluorescence light by the fluorescent markers has the local minimum, an intensity distribution of the excitation light may have a maximum at the respective position of the local minimum of the intensity distribution of the further light, and the further light may be fluorescence inhibition light which inhibits the emission of fluorescence light by the fluorescent markers. In this embodiment of the method according to the invention, the excitation light and the fluorescence inhibition light are thus superimposed with such intensity distributions as they are also used in RESOLFT and particularly in STED microscopy. In this embodiment of the method according to the invention, it is, however, not only used that the fluorescence light may only origin from a fluorescent marker which is in the area of the local minimum. Instead, the dependency of the intensity of the fluorescence light which is registered for the respective fluorescent marker on the distance of its position to the position of the local minimum is also used to determine its position at a particularly high precision from the intensities of the fluorescence light registered for several positions of the minimum. Correspondingly, even in this variant of the method of the invention in which the intensity distribution of the further light has the local minimum, the local minimum may be positioned at such a low number of positions in the sample and the evaluation of the intensities of the registered fluorescence light may follow the same principles as in MINFLUX microscopy. However, the difference remains that in MINFLUX microscopy the intensity of the fluorescence light from the fluorescent marker increases with increasing distance of its position to the position of the local minimum, whereas in the embodiment of the method according to the invention in which the further light is fluorescence inhibition light, it decreases with increasing distance.

In the embodiment of the method according to the invention in which the intensity distribution of the excitation light has the local minimum, the individualized fluorescent markers are only subjected to a minimum light amount and thus only photo-chemically stressed to a minimum extent. In the embodiment in which the further light whose intensity distribution has the zero point is fluorescence inhibition light, the intensity maxima of the fluorescence inhibition light neighboring the zero point advantageously inhibit that fluorescence light emitted by other fluorescent markers in the neighborhood disturbs the position determination.

In carrying out the method according to the invention, it has been found that the local minimum needs not to be arranged at many different positions in the close-up range around the position of the respective positioning aid to determine the position of the respective fluorescent marker at a very high spatial resolution as compared to the dimensions of the close-up range. Correspondingly, in the method according to the invention, the positions of the individual fluorescent markers are typically determined from the intensities of the fluorescence light which are registered for not more than 4n, often for not more than 3n and particularly preferably for not more than 2n different positions of the minimum. Here, n is the number of spatial directions in which the positions of the individual fluorescent markers in the sample are determined.

Determining the positions of the individual fluorescent markers in the sample may particularly include fitting a spatial function having a local extremum to the intensities of the fluorescence light registered for the respective fluorescent marker for the different positions of the minimum. In the embodiment of the method according to the invention in which the intensity distribution of the excitation light has the local minimum, the local extremum of the spatial function is also a local minimum. In the embodiment in which the further light whose intensity distribution has the zero point is fluorescence inhibition light, the local extremum of the spatial function, however, is a local maximum.

The spatial function having the local extremum ideally has the same course as the intensity of the fluorescence light from the respective fluorescent marker over its distance to the local minimum of the intensity distribution of the excitation light or the further light. Thus, at least one of the light reflecting positioning aids or directly at least one of the fluorescent markers or a further similar fluorescent marker may be scanned with the minimum while the light reflected or fluorescence light emitted out of the sample is registered with temporal resolution to determine the spatial function having the local extremum. Here, scanning means that the local minimum is shifted in a high number of small steps as compared to the few positions of the local minimum in the respective close-up range. In scanning the at least one of the light reflecting positioning aids, its position in the sample and thus the center of the respective close-up range may also be determined.

To be able to register the fluorescence light emitted out of the sample separately for the individual fluorescent markers by which the respective structure is marked, the fluorescence light emitted by the different fluorescent markers has to be separable. Herein, it is not possible to separate the fluorescence light from the different fluorescent markers based on from where it is emitted out of the sample as several fluorescent markers are each attached to the same nano-scale structure so that they are closer and as a rule much closer to each other than the diffraction limit at the wavelength of the fluorescence light. Thus, other differentiation options with regard to the fluorescence light from the individual fluorescent markers have to be present or provided.

If the fluorescent markers by which the individual structures are marked at different locations are selected from fluorescent markers which differ in their spectral properties, the individual fluorescent markers at the respective structure may selectively be excited by excitation light of different wavelengths or the fluorescence light emitted by them may be detected in a wavelength-selective way. Further, the fluorescent markers may be selected from fluorescent markers that have an active state in which they can be excited by excitation light for the emission of fluorescence light and an inactive state in which they—at least with the same excitation light—cannot be excited for the emission of fluorescence light, and that can be transferred between their active and their inactive state. Then, only one fluorescent marker may respectively be left in its active state or brought in its active state—selectively or based on transfer probabilities—so that the registered fluorescence light following to excitation with the excitation light may only origin from that one. In the procedure based on transfer probabilities, it may be that repeatedly the same fluorescent marker gets into its active state. With an increasing number of repetitions, this, however, gets more and more unlikely.

Particularly, the fluorescent markers may thus be selected from those fluorescent markers which differ in at least one of their excitation spectrum and their emission spectrum or which can be switched with switching light out of their active state into their inactive state. The switching light may generally have the same wavelength as the excitation light or the further light which has an influence on the emission of fluorescence light by the fluorescent markers.

In the practical implementation of the method according to the invention, the positions of the positioning aids, i.e. the close-up ranges, may be approached by other means for relative movement of the minimum with regard to the sample than the positions of the minimum within the close-up ranges. This allows for using means for the fine positioning of the minimum within the close-up ranges which are suitable for precisely positioning the minimum within the sample but not for shifting the minimum over larger distances. These larger distances may be covered by the means for approaching the positions of the positioning aids. Particularly, the means for approaching the positions of the positioning aids may move the entire sample with regard to an objective lens which focuses the excitation light into the sample, whereas the minimum is shifted within the respective close-up range with beam deflection means deflecting the beam with regard to the objective lens.

In the method according to the invention, the positions of the positioning aids are preferably fixed within the sample and thus with regard to fixed-points of the sample, and the positions of the positioning aids, i.e. the individual close-up ranges, are approached relative to the fixed-points of the sample.

Advantageously, the structures, due to their coupling to the positioning aids, are not just brought into a known position or into a position which can be determined without stressing the fluorescent markers, but the structures are also oriented in a defined way, i.e. for example parallel to a plane of main extension of the respective sample. This orientation particularly has the purpose to orient the structure with regard to the sample in such a way that distances of the fluorescent markers or of the different locations at which the structures are marked with the fluorescent markers are arranged in or in parallel to the direction or plane in which the local minimum is arranged at different positions in the sample. Thus, these distances and also the alterations of these distance are particularly easily recorded by determining the positions of the individual fluorescent markers. Even if such a purposeful orientation of the structures coupled to the positioning aids is not possible, it may often be achieved that the structures coupled to the positioning aids have a fixed orientation within the sample. Then, after a first determination of the positions of the fluorescent markers it can be checked which of the structures are oriented in such a way that the distances of their areas marked with the fluorescent markers run in the plane of main extension of the sample. In repeatedly executing the determination of the positions of the fluorescent markers to, for example, record reactions of the structures to altered surrounding conditions, the method of the invention may afterwards be restricted to those structures which have the desired orientation whereas other structures which do not have this orientation are no longer considered. This is particularly suitable to quickly record significant information on reactions of the structures to altered surrounding conditions.

Further, it is preferred that the positions of the positioning aids are arranged at minimum distances which are at least twice as long as the diffraction limit at the wavelength of the excitation light and the fluorescence light. Then, the fluorescence light coming out of the sample may be separately assigned by optical means to the individual close-up ranges and thus to the individual nano-scale structures to be measured. If the positions of the positioning aids are voluntarily defined in that they are, for example, arranged in a predefined pattern in the sample, said minimum distance of twice the diffraction limit at the wavelength of the excitation light and the wavelength of the fluorescence light is to the kept directly. If, however, the positioning aids are randomly distributed within the sample, it has to be cared for by means of a low density of the positioning aids that their distances are not smaller than twice the diffraction limit at the wavelength of the excitation light and the wavelength of the fluorescence light. As a rule, this requires a density which is much smaller than the reciprocal value of twice the diffraction limit at the wavelength of the excitation light and the wavelength of the fluorescence light. Alternatively or additionally, the positioning aids may be checked for the distances which are present between them. Then, positioning aids whose positions are acknowledged as being too close with regard to each other, and the nano-scale structures coupled thereto may be neglected when further executing the method according to the invention.

If the positions of the positioning aids are arranged in a predefined pattern within the sample, the predefined pattern may particularly be selected from periodical and more specifically from hexagonal and square patterns. Then, the close-up ranges to be approached when executing the method according to the invention are also arranged in such a periodical, hexagonal or square pattern. In a hexagonal pattern, the density of the positioning aids which keep the minimum distances of twice the diffraction limit at the wavelength of the excitation light and the wavelength of the fluorescence light is maximized.

In so far as, by means of the embodiment of the method according to the invention in which the intensity distribution of the further light which has an influence on the emission of fluorescence light by the fluorescent markers is fluorescence inhibition light and has the local minimum, and in which the intensity distribution of the excitation light has the maximum at the respective position of the local minimum of the intensity distribution of the further light, a similar procedure as in RESOLFT and particularly in STED microscopy is disclosed, this is another aspect of the present invention which is independent on the step of spatially measuring a plurality of nano-scale structures, the step of coupling the individual structures to individual positioning aids and the step of arranging the local minimum at the different positions particularly in the close-up range around the position of the respective positioning aid.

In this other aspect, the present invention differs from RESOLFT and STED microscopy in that by purpose the positions of individualized fluorescent markers are determined, for which purpose the fluorescent markers are often to be individualized at first, and that the intensities of the fluorescence light registered for a low number of different positions of the local minimum are evaluated, as a rule, by fitting a function comprising a local maximum. Here, the position of the local maximum of the fitted function may be taken as the searched for position of the fluorescent marker in the sample. As compared to the corresponding procedure in MINFLUX microscopy, this other aspect of the present invention has the advantage that the intensity maxima of the fluorescence inhibition light neighboring the zero point advantageously inhibit that fluorescence light emitted by other fluorescent markers arranged in the surroundings disturb the position determination. Further, this other aspect of the present invention may comprise or may not comprise all further features of the method according to the invention disclosed here.

In this other aspect of the present invention, an intensity distribution of the excitation light preferably has a maximum at the respective position of the zero point or local minimum of the intensity distribution of the fluorescence inhibition light. Thus, the excitation light is concentrated to the area of the local minimum of the intensity distribution of the fluorescence inhibition light even if its maximum, due to the diffraction limit, has larger dimensions than they are possible for a local minimum and than they are regularly implemented for the local minimum in the method according to the present invention.

In this other aspect of the present invention, the fluorescence inhibition light may particularly be STED or stimulation light which de-excites the fluorescent markers excited by the excitation light by stimulating them for stimulated emission before they can emit fluorescence light which could be registered. In this other aspect of the present invention, it is, however, not only exploited that the fluorescence light may only origin from a fluorescent marker which is in the area of the local minimum of the fluorescence inhibition light. Instead, the dependency of the intensity of the fluorescence light which is registered for the respective fluorescent marker on the distance of its position to the position of the local minimum is also used in determining its position at a particularly high precision from the intensities of the fluorescence light registered for several positions of the minimum. In this other aspect of the present invention, the minimum may correspondingly be arranged at as few positions in the sample and the evaluation of the intensities of the registered fluorescence light may take place according to basically the same principles as in MINFLUX microscopy. As a significant difference it however remains that in MINLUX microscopy the intensities of the fluorescence light from the respective fluorescent marker increases with increasing distance of its position to the position of the local minimum whereas it decreases in the method according to the invention.

In so far as this other aspect of the present invention overlaps with RESOLFT and particularly with STED microscopy, it nevertheless also differs from RESOLFT and STED microscopy in that purposefully the positions of individualized fluorescent markers are determined for which purpose the fluorescent markers often have to be individualized at first, and in that intensities of the fluorescence light which have been registered for few different positions of the local minimum only are evaluated for the position determination: This position determination, as a rule, includes fitting a function comprising a local maximum. The position of the local maximum of the fitted function may be taken as the position of the fluorescent marker in the sample.

As compared to the proceedings in MINFLUX microscopy, this other aspect of the present invention has the advantage that, due to the intensity maxima of the fluorescence inhibition light neighboring its zero point, no fluorescence light emitted by fluorescent markers located in the surroundings disturbs the position determination.

In an embodiment of this other aspect of the present invention, the positions of the individual fluorescent markers are additionally determined by MINFLUX microscopy. This means that additionally the following steps are executed: Exciting the fluorescent markers with excitation light for emission of fluorescence light, wherein the intensity distribution of the excitation light has a local minimum which is arranged at different positions in the sample, registering the fluorescence light emitted out of the sample separately for the individual fluorescent markers and for the different positions of the minimum of the intensity distribution of the excitation light, and determining the positions of the individual fluorescent markers in the sample from the intensities of the fluorescence light determined for the respective fluorescent marker for the different positions of the minimum of the intensity distribution of the excitation light.

In the additional steps of this embodiment of the other aspect of the present invention, it is possible to approach the same positions with the minimum of the intensity distribution of the excitation light as previously or afterwards with the minimum of the intensity distribution of the fluorescence inhibition light. This, however, is only an option.

In the additional steps of this embodiment of the other aspect of the present invention, the individualized fluorescent markers are only subjected to a minimum light amount and thus only minimally stressed photo-chemically.

Further, in this embodiment of the other aspect of the present invention, complementary intensity courses of the fluorescence light emitted by the individual fluorescence markers out of the sample, which, on the one hand, result over the different positions of the minimum of the intensity distribution of the fluorescence inhibition light and, on the other hand, result over the different positions of the minimum of the intensity distribution of the excitation light in the sample, may be compared to each other in determining the positions of the individual fluorescence markers in the sample. By consideration of both complementary intensity courses, the position of the respective fluorescence marker in the sample can be determined at a higher precision than on basis of the two intensity courses if they are only evaluated separately.

Further, in this embodiment of the other aspect of the present invention, positions of the individual fluorescence markers in the sample, which are determined from the intensities of the fluorescence light registered for the respective fluorescence marker for the different positions of the minimum of the intensity distribution of the fluorescence inhibition light, may be considered in defining the positions at which afterwards the other minimum of the intensity distribution of the excitation light is arranged and vice versa. In iteratively determining the positions of the individual fluorescence markers with increasing precision, one may step by step change between a STED and a MINFLUX constellation.

In all aspects of the method according to the present invention in which the intensity distribution of the excitation light or the further light which has in influence on the emission of fluorescence light by the fluorescent markers has the local minimum, the concept of protecting the presently not measured fluorescent markers against the high intensities in the area of the maxima neighboring the local minimum known from WO 2014/108455 A1 may be applied in a modified form. Particularly, prior to arranging the local minimum in the respective close-up range, additional switch off light is directed to the sample at such an intensity distribution that it switches off the switchable fluorescent markers within partial areas of the sample neighboring the close-up range into an inactive state. Thus, the fluorescent markers are switched into the inactive state there where the maxima of the excitation light or the further light appear and where, without this protective measure, the fluorescent markers would be stressed by the high intensities of the excitation light or the further light and from where they would only emit fluorescence light affecting the present measurement. The absolute density of nano-scale structures in the sample may then be particularly high without measuring of each nano-scale structure necessarily photo-chemically stressing its neighboring nano-scale structures, and without fluorescence light from the nano-scale structures disturbing the present measurement.

In the practical application of the method according to the invention, the positioning aids may be coupling sites for the structures which are fixed within the sample and which may be arranged in a predefined pattern within the sample. Particularly, the structures may be coupled to the coupling sites via an immunoreaction. Here, prior to the application of the method according to the invention, at first an additional fluorescent marker may be coupled to the coupling sites whose fluorescence light may be used for determining the positions of the coupling sites. Here, very many photons of the fluorescence light from the further fluorescent marker may be used to determine the positions of the coupling sites at a very high precision. Afterwards, these further fluorescent markers can be released from the coupling sites whose positions are known, when the nano-scale structures are coupled in the following application of the method according to the invention.

If, however, the nano-scale structures are coupled to the positioning aids before their positions are known, possibilities of determining the positions of the positioning aids without having to use the fluorescence light from the fluorescent markers at the nano-scale structures are to be provided. For this purpose, the positioning aids may comprise gold or silver particles or quantum dots which reflect light by means of which the positions of the positioning aids can be determined at a high precision.

In one embodiment of the method according to the invention, the measured nano-scale structures are equal or at least include several equal structures. These equal structures may be subjected to different surrounding conditions in different areas of the sample to measure the influences of the surrounding conditions on the nano-scale structures. Particularly, the resulting spatial distance or the relative arrangement of the fluorescent markers at the nano-scale structures may be measured.

Further, the positions of the individual fluorescent markers in the sample may be determined for at least two different points in time from the intensities of the fluorescence light registered for these at least two points in time to, for example, measure reactions of the structures to altered surrounding conditions or, in addition to that, a dynamic of these reactions. For this purpose, the structures may be subjected to different surrounding conditions at these at least two points in time, or the at least two points in time may follow to such an alteration of the surrounding conditions.

The embodiment of the method according to the invention described at last particularly allows for carrying out drug screenings in which the altered surrounding conditions are adjusted by adding one of the substances to be searched. The reaction of the structure to the addition of the respective substance is directly recorded by repeated measurement of the structure according to the invention. There is no need of carrying out analytical reactions at the nano-scale structure. Further, the amounts of the substances to be searched spent in such a drug screening according to the invention are tiny. Theoretically, the addition of a single molecule of each of the substances to one of the nano-scale structures is sufficient. Correspondingly, even substances which are only available in small amounts may be examined in a drug screening according to the invention.

In an embodiment of the method according to the invention which is inspired by the known PAINT (Point Accumulation for Imaging in Nanoscale Topography) concept, the fluorescent markers are selected from fluorescent markers which are movable in the sample and which individually attach to the structure at different positions. These fluorescent markers are added to the sample in such a concentration and in such a spatial distribution that they are one after the other individually attached to the structure. When they are attached to the structure, their position is determined according to the invention. Thus, in this embodiment of the invention the same individualization of the fluorescent markers is used as in the PAINT concept. Correspondingly, all variants of this individualization which are known for the PAINT concept may also be used in this embodiment of the method according to the invention. Thus, the fluorescent markers may be transferred out of an inactive state in which they are not excitable with the excitation light for the emission of fluorescence light into an active state in which they are excitable with the excitation light for the emission of fluorescence light. This transfer may be due to the attachment of the fluorescent markers to the structure. Alternatively or additionally, the fluorescent markers may only temporally attach to the structure or they are permanently or at least for such a long time transferred in a dark state that they do not disturb the further measurement of the respective nanoscale structure due to a long time influence of at least one of the excitation light and the fluorescence inhibition light.

An apparatus according to the invention for spatially measuring a plurality of nano-scale structures in a sample, wherein each of the structures is coupled to a positioning aid whose position in the sample is known or determinable from light reflected by the positioning aid comprises the following components:

a sample holder for the sample, an objective lens pointing towards the sample holder, a light source coupling excitation light and optionally further light which has an influence on the emission of fluorescence light by the fluorescent markers into the objective lens in such a way that an intensity distribution of the excitation light focused by means of the objective lens or of the simultaneously focused further light has a local minimum, a scanning unit which is configured to shift a position of the minimum with regard to the sample holder, a detector which is configured to register fluorescence light emitted out of the sample separately for the different positions of the minimum, an evaluation unit which is configured to determine positions of individual fluorescent markers in the sample from the intensities of the fluorescence light registered for the respective fluorescent marker for the different positions of the minimum, and a controller for automatically executing the method according to the invention.

Referring now in greater detail to the drawings, the method according to the invention depicted in FIG. 1 in a flowchart starts with a step of marking 1 nano-scale structures at different locations with fluorescent markers. This means that each of the nano-scale structures is marked at each of at least two selected and in case of equal structures also equal locations with one fluorescent marker. The fluorescent markers attached at the different locations of the respective structure may be identical if they have an active and an inactive state between which they may be transferred, or they differ in their spectral properties with regard to at least one of the excitation light by which they are excitable for the emission of fluorescence light and the fluorescence light emitted by them following to the excitation.

A step of coupling 2 the nano-scale structures to positioning aids is shown in FIG. 1 as a step subsequent to the step of marking 1. The step of coupling 2 the structures to the positioning aids may, however, precede the step of marking 1 the structures. Further, it is possible that the steps of marking 1 and coupling 2 are carried out simultaneously. In any case, after the steps of marking 1 and coupling 2 nano-scale structures are present which are each marked several times and which are individually coupled to individual positioning aids. Herein, the positions of the positioning aids in a sample are either known which implies that they are fixed, or they are determinable from light which is reflected by the positioning aids because they, for example, include gold or silver particles or quantum dots. This determination of the positions of the positioning aids may thus take place without stressing the fluorescent markers by excitation and emission of fluorescence light. As long as their actual positions are always determinable, it is also possible that the positioning aids are not fixed within the sample but may move within the sample. With non-fixed positions of the positioning aids in the sample it is, however, more difficult to ensure that distances of the positioning aids in the sample do not get smaller than twice the diffraction limit at the wavelength of the excitation light and the fluorescence light to be able to assign the fluorescence light stemming from the fluorescent markers at the individual structures always for sure to a certain positioning aid and thus to the structure coupled thereto.

In a step of arranging 3 a local minimum of an intensity distribution of light at different positions in a close-up range of the respective positioning aid, the intensity distribution of the light may particularly be one of excitation light. If the local minimum of this intensity distribution is arranged in the close-up range of the respective positioning aid, the fluorescent markers which are in their active state and which can be excited by means of the excitation light emit fluorescence light. Herein, the intensity of the fluorescence light depends on the distance of the respective fluorescent marker to the local minimum of the intensity distribution. If a step of registering 4 the emitted fluorescence light is carried out such that the fluorescence light is separately registered for each of the fluorescent markers, because the fluorescence light from different fluorescent markers may be separated due to different wavelengths, or only one of the fluorescent markers is active at one time, determining 5 the position of the individual fluorescent marker from the intensities of the fluorescence light from the respective fluorescent marker registered for the different positions of the minimum is possible. Herein, the precision of the step of determining 5, with an equal number of photons of the fluorescence light registered, depends on how close the positions of the local minimum are already to the position of the fluorescent marker. In that the positions of the local minimum in the step of arranging 3 are arranged in a close-up range of the respective positioning aid, in which the coupled structure and the fluorescent markers attached thereto are also located, the relative precision in the step of determining 5 the positions of the fluorescent markers depends on the size of this close-up range.

If the position of the positioning aid is known very precisely, like for example at least at ±40 nm or ±20 nm or ±10 nm or ±5 nm, and if the step of coupling 2 the structures to the positioning aids is carried out such that they have a maximum distance to the position of the positioning aid of the same order, the close-up range of the respective positioning aid in which the positions of the minimum are arranged may be kept correspondingly small. If the positions of all fluorescent markers with which the respective structure is marked have been determined, wherein relative positions of the fluorescent markers with regard to each other, i.e. their distances, are of particular interest, the respective structure is measured. This measurement may be repeated after or during a step of altering 6 surrounding conditions of the structures. Here, the surrounding conditions of all structures in the sample may be altered in a same way. In this way, for example, the reactions of different nano-scale structures to the same alteration of the surrounding conditions may be recorded. Alternatively, the step of altering 6 the surrounding conditions may be carried out differently in different areas of the sample and thus, for example, in different ways for same structures. For example, different substances may be added in different areas of the sample to same structures to record the different reactions of the structures to the substances. This may, for example, be carried out in a drug screening. Independently on whether the structures in the sample are equal or different, a new measurement of the structures by executing the steps of arranging 3, registering 4 and determining 5 follows to the step of altering 6 the surrounding conditions of the structures.

Figure 2:
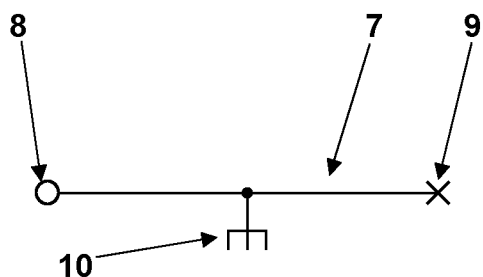
FIG. 2 schematically shows the step of coupling a nano-scale structure to a positioning aid and the reaction of the nano-scale structure to a substance added.
Figure 2:
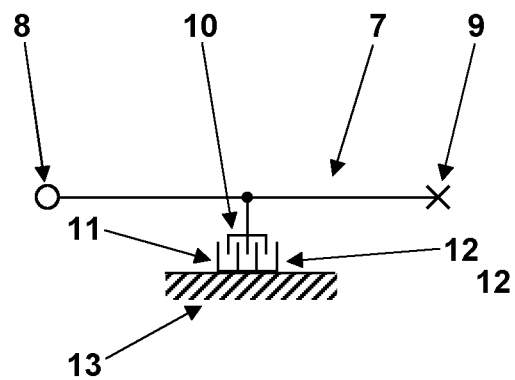
Figure 2:
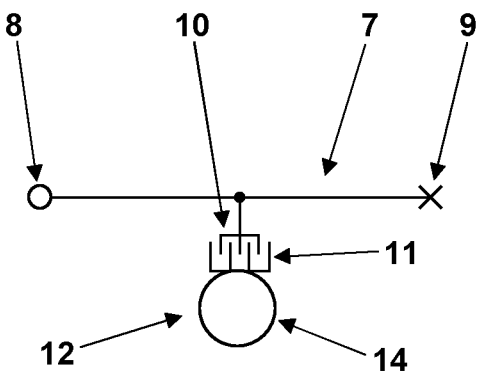
Figure 2:
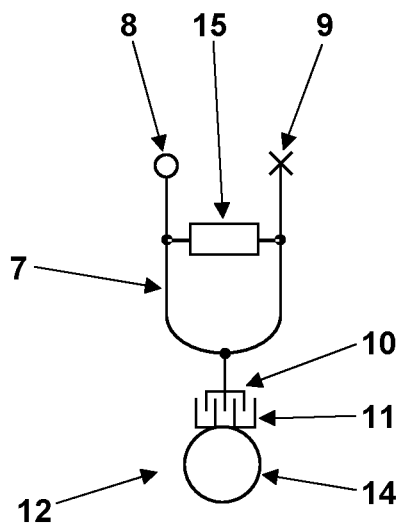

FIG. 2 (*a*) very schematically shows an example of a nano-scale structure 7 which is marked at each of its two ends with a fluorescent marker 8 or 9, respectively. The fluorescent markers 8 and 9 are depicted differently. As already explained, the fluorescent markers may also be equal, if they are transferable between an active and an inactive state. This may, for example, be achieved by means of additional switching light which transfers the fluorescent markers 8 and 9 according to transfer probabilities into their active or inactive state so that by repeatedly applying the switching light switching states are achieved in which once only the one fluorescent marker 8 and once only the other fluorescent marker 9 is active. Further, a central coupling point 10 is formed at the structure 7. The coupling point 10 is designed for coupling to a corresponding coupling site 11 of a positioning aid 12.

FIG. 2 (*b*) shows the coupling point 10 coupled to the coupling site 11 of a positioning aid 12 which only consists of the coupling site 11 here which is fixed with regard to the remainder of the sample 13.

FIG. 2 (*c*), on the other hand, shows the structure 7 coupled via the coupling point 10 to a positioning aid 12 which, besides the coupling site 11, includes a gold particle 14. By means of light which is reflected by the gold particle 14, even a changing position of the positioning aid 12 in the respective sample is determinable without stressing the fluorescent markers 8 and 9 by excitation with excitation light and emission of fluorescence light.

FIG. 2 (*d*) shows the structure 7 coupled to the positioning aid 12 according to FIG. 2 (*c*) which is altered due to the influence of a substance 15 as an example of altered surrounding conditions of the structure 7. Particularly, the alteration consists of folding the end of the structure 7 together so that the distance of the fluorescent markers 8 and 9 attached thereto is reduced. Thus, the reaction of the structure 7 to the substance 15 may be directly recorded by measuring the distance between the fluorescent markers 8 and 9.

Figure 3:
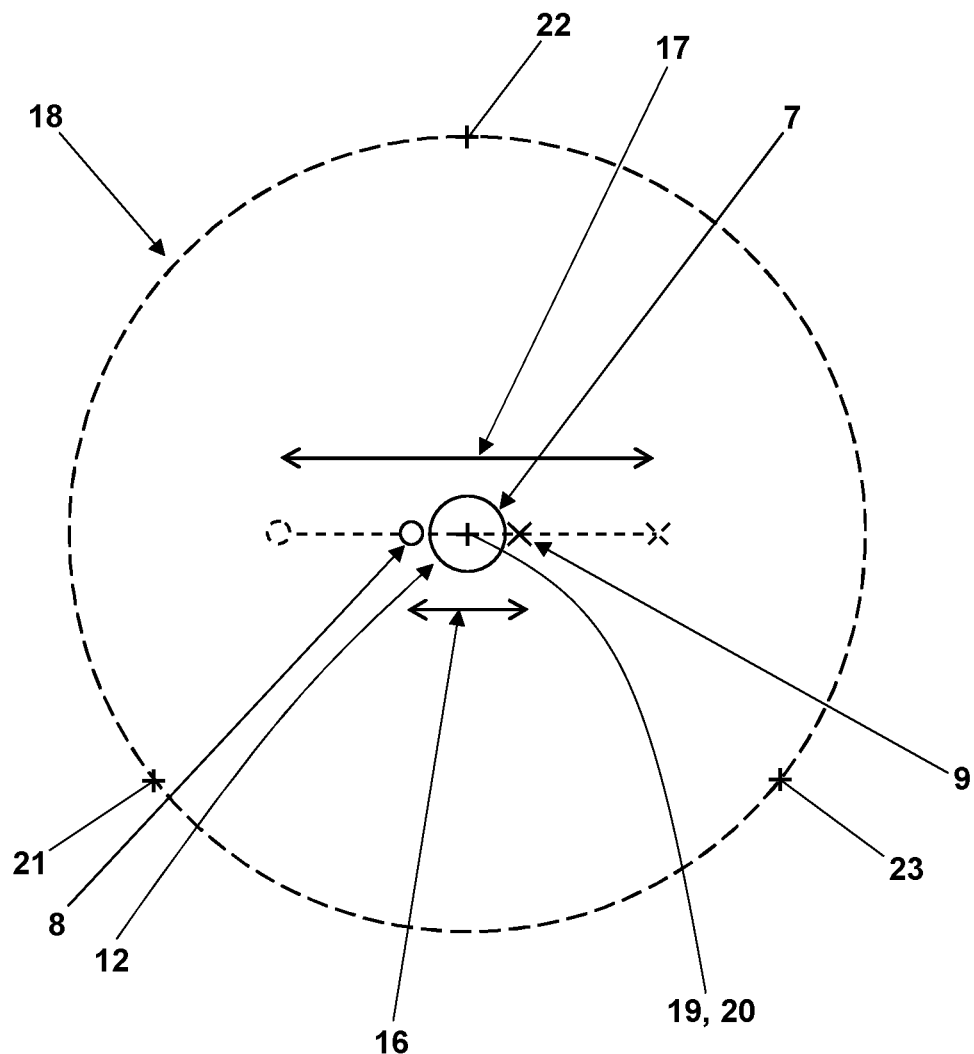
FIG. 3 explains the positioning of a minimum of an intensity distribution of excitation light with regard to the positioning aids in a MINFLUX embodiment of the method according to the invention.

FIG. 3 shows the structure 7 with the positioning aid 12 in a viewing direction orthogonal to the distance between its two ends, wherein, besides the reduced distance 16 according to FIG. 2 (*d*), the starting distance 17 with a stretched structure 7 according to FIG. 2 (*c*) is also depicted. Further, a close-up range 18 around a known or previously determined position 19 of the positioning aid 12 is depicted in FIG. 3. A local minimum of the intensity distribution of the excitation light for exciting the respective active fluorescent marker 8, 9 at four different positions 20 to 23 is arranged within this close-up range, wherein the position 20 coincides with the position 19 of the positioning aid 12, and the positions 21 to 23 are equidistantly arranged on a circle around the position 19, 20. For each position 20 to 23, the fluorescence light from the respective fluorescent marker 8, 9 is registered separately. Then, the position of the respective fluorescent marker 8, 9 in the close-up range can be determined very precisely from the intensities of the registered fluorescence light. The precision of the determination depends on the dimensions of the close-up range, i.e. on its diameter, which could only be half as big as compared to FIG. 3. This would, however, require that the position 19 of the positioning aid 12 would be known at an extreme precision and would actually coincide with the center of the structure 7. To compensate for imprecisions and variants occurring here, the close-up range 18 has to be selected larger than it appears to be necessary under ideal boundary conditions.

Figure 4:
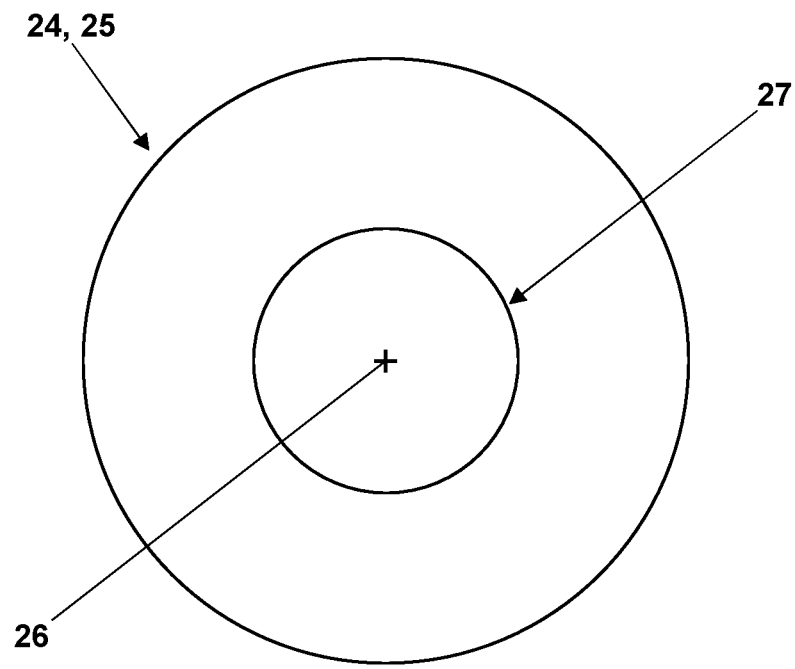
FIG. 4 illustrates the intensity distribution of the excitation light in a MINFLUX embodiment of the method according to the invention both in a plane view and in a section through the minimum.
Figure 4:
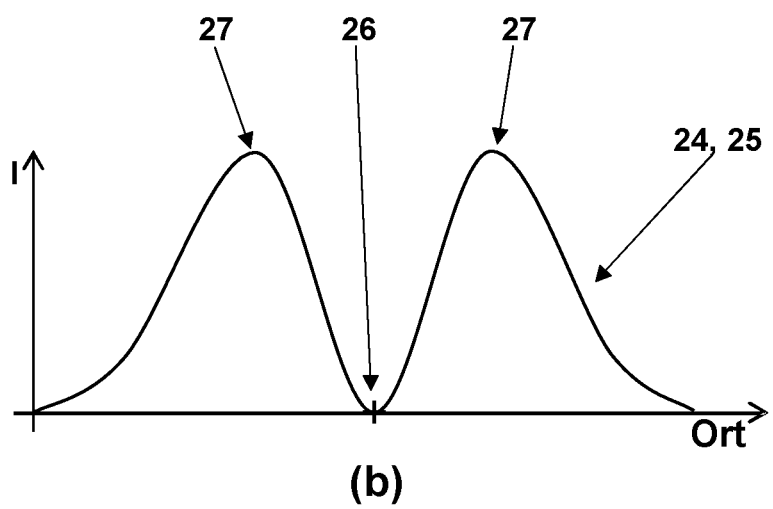

FIG. 4 shows an intensity distribution 24 of excitation light 25 having a central local minimum 26 in a plane view (a) with the viewing direction of FIG. 3 and in a section (b) running orthogonal thereto through the local minimum 26. The local minimum 26 is enclosed at all sides by a maximum 27 of the intensity distribution. In the local minimum 26, the intensity of the excitation light 25 ideally goes down to zero. With increasing distance to the minimum 26, the intensity I at first increases quadratically before it reaches its maximum value in the ring-shaped maximum 27. In the method according to the invention, the area directly around the minimum 26, in which the intensity I increases quadratically so that the intensity of the fluorescence light emitted by the respective fluorescent marker and registered allows for a positive conclusion on the distance of the fluorescent marker to the minimum 26, is used of this intensity distribution 24. From a plurality of such distances which are determined for several positions of the minimum 26 in the respective close-up range, the precise position of the fluorescent marker may thus be determined, for example by triangulation or even better by fitting a function having a local minimum to the intensities of the fluorescence light registered for the individual positions of the minimum.

The spatial function having the local minimum which is to be fitted to the intensities of the fluorescence light registered for the individual positions of the minimum describes the dependency of the intensity of the fluorescence light on the distance of the respective fluorescent marker to the local minimum 26. Correspondingly, this function may be determined by scanning the same or a similar fluorescent marker or even a light reflecting positioning aid of a same effective cross section. Here, scanning means that the local minimum 26 is indeed shifted in small steps, like for example at least 5×5 steps or 10×10 steps, to determine the course of a two-dimensional function.

Figure 5:
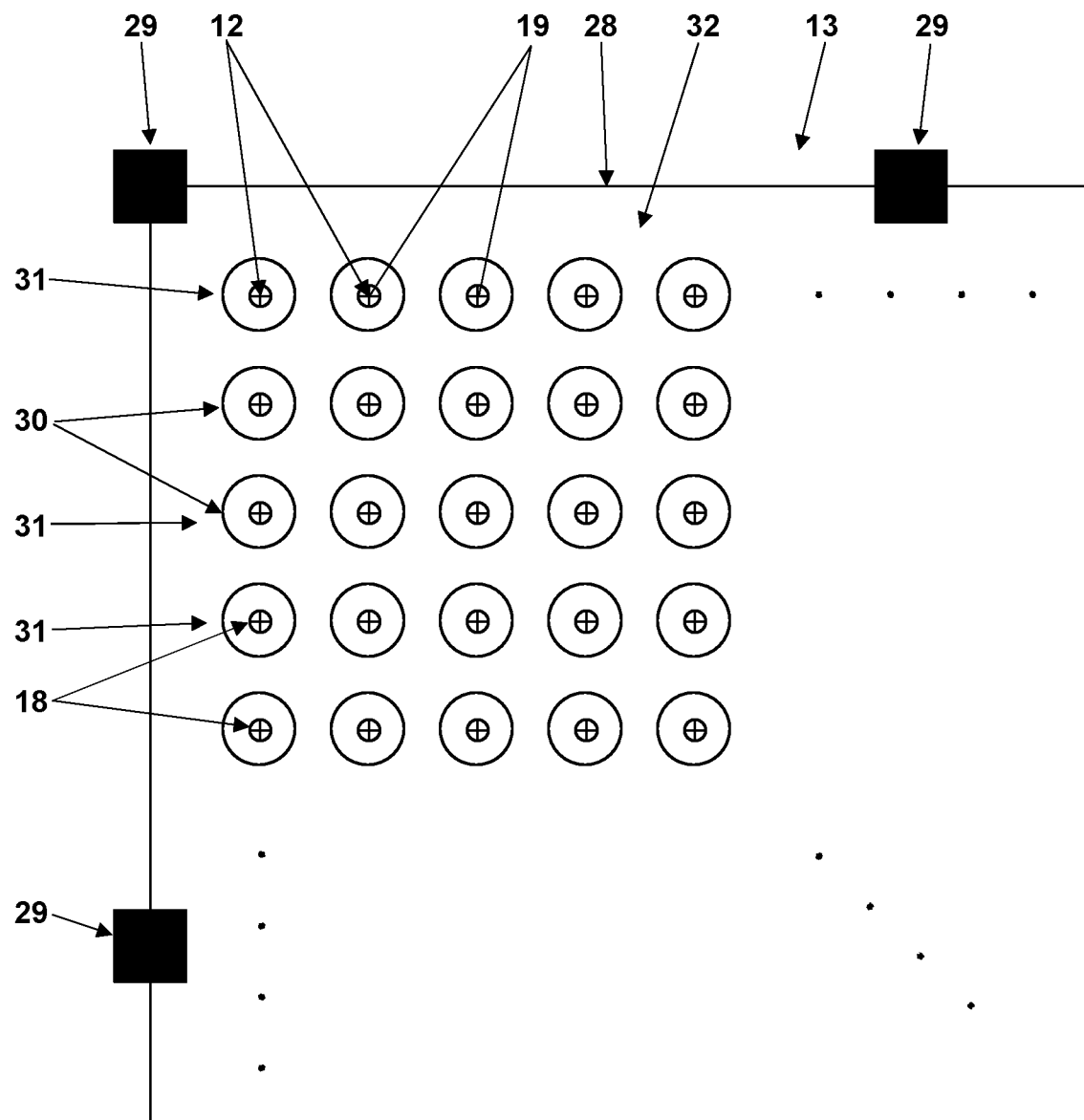
FIG. 5 shows a sample with positioning aids arranged in a square pattern.

FIG. 5 shows a sample 13 for carrying out a drug screening embodiment of the method according to the invention. The sample 13 has fixed points 29 for positioning the sample 13 on a sample holder at its outer circumference 28. A plurality of positioning aids 12, with their positions 19, are arranged in a quadradic pattern with regard to the fixed points 29. Each positioning aid 12 is located in a depression or a so-called hole 30 of the sample 13. The holes 30 which are accordingly arranged in lines 31 and columns 32 allow for adding a substance selectively to a structure coupled to the positioning aid 12 in the respective hole 30 in the sample 13. Thus, reactions of equal or unequal structures to different substances can be recorded. For this purpose, the structures are measured according to the method according to the invention prior to and after and optionally also during adding the substances, wherein the positions of the minimum 26 of the intensity distribution 24 according to FIG. 4 are each directly arranged in the close-up range 18 around the respective position 19 of the positioning aid. Thus, the reaction of the respective structure can be recorded at a high speed, at a low number of photons emitted per fluorescent marker and nevertheless at a high precision.

Figure 6:
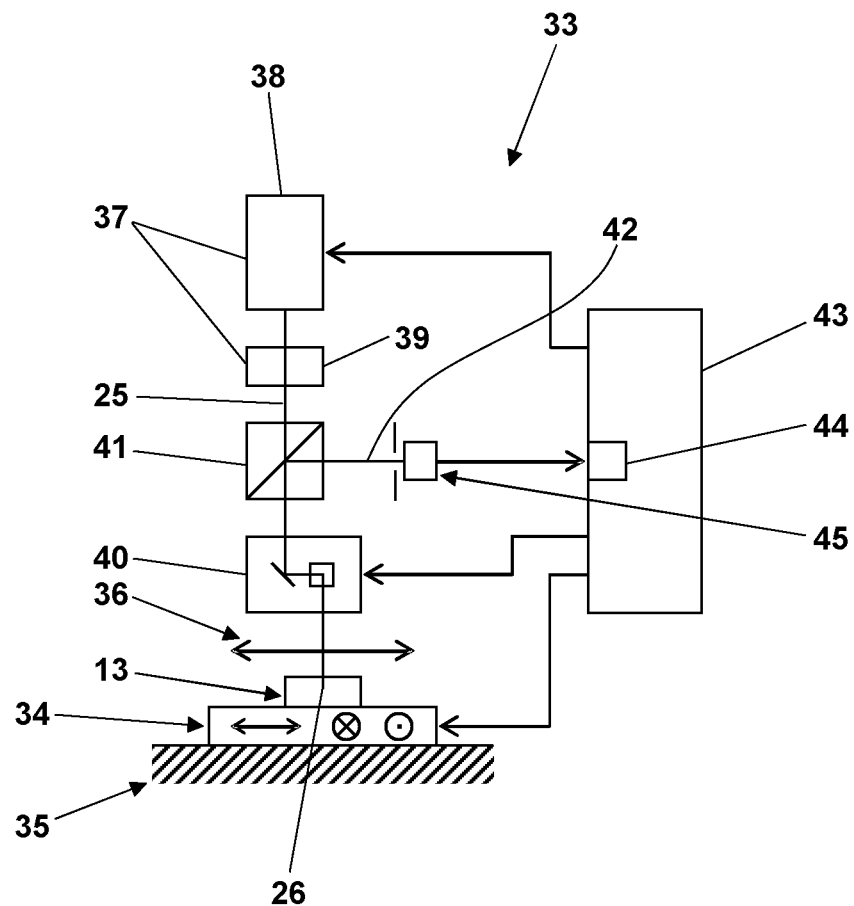
FIG. 6 schematically shows an apparatus for executing the method according to the invention.

FIG. 6 shows an apparatus 33 for carrying out the method according to the invention. The apparatus 33 comprises a sample holder 34 for the sample 13 by which the sample 13 is movable with regard to a base 35 to position it with regard to the further base-fixed components of the apparatus 33. This positioning particularly serves for approaching the respective close-up range 18 around the respective positioning aid. Particularly, positioning is carried out with regard to an intensity distribution of the excitation light 25 which is focused into the sample by an objective lens 36. The excitation light 25 is provided by a light source 37 in such a way that in focusing by means of the objective lens 36 the intensity distribution according to FIG. 4 is adjusted in the sample 13. For this purpose, the light source 37, besides a laser 38, comprises beam shaping means 39, like for example in form of a so-called easySTED waveplate. A scanning unit 40 which is also designated as a scanner is provided to shift the minimum 26 in the sample within the respective close-up range 18. A dichroitic beam splitter 41 arranged between the light source 37 and the scanning unit 40 outcouples fluorescence light 42 from the sample 13 towards a confocal detector 42. A controller 43 controls the apparatus 33 for automatically executing the method according to the invention, particularly in a drug screening. Here, the apparatus 33 may also comprise an additional device not depicted in FIG. 6 to add different substances into the individual holes 30. The controller 43 includes an evaluation unit 44 which determines the positions of the individual fluorescent markers in the sample from the intensities of the fluorescence light registered for the respective fluorescent marker for the different positions of the minimum.

Figure 7:
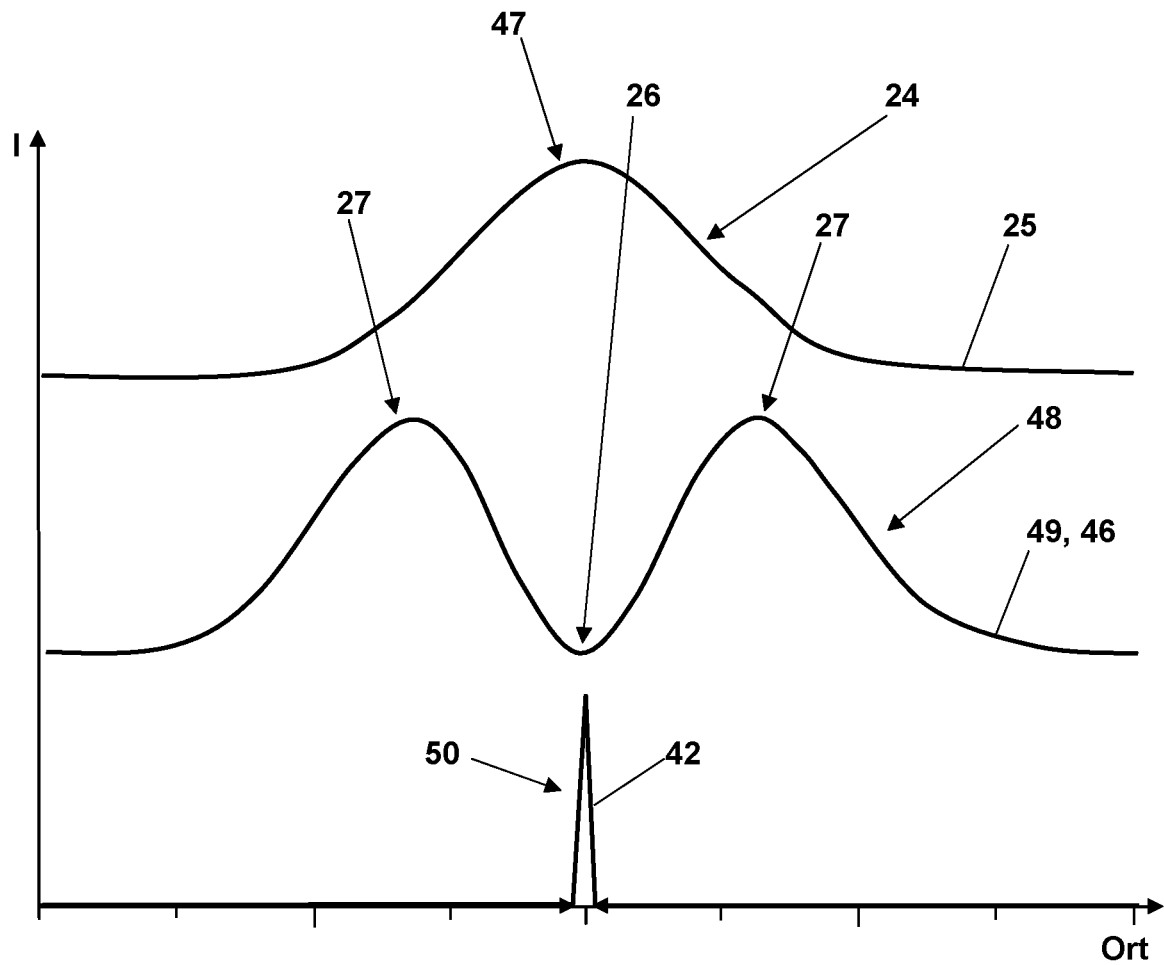
FIG. 7 illustrates the intensity distributions of the excitation light and of fluorescence inhibition light in a further embodiment of the method according to the invention in a section through the minimum.

FIG. 7 illustrates a further embodiment of the method according to the invention in which not the intensity distribution 24 of the excitation light 25 has the local minimum 26, but an intensity distribution 48 of further light 49 in form of fluorescence inhibition light 46. Here, the minimum 26 of the intensity distribution 48 surrounded by the intensity maxima 27 is concentrically arranged with regard to a local maximum 47 of the intensity distribution 24. This results into a spatially limited intensity distribution 50 of the fluorescence light 42 emitted by the respective fluorescent marker over its distance to the local minimum 26. The intensity distribution 50 depicted in FIG. 7 results from an intensity distribution 48 with extremely high intensities of the fluorescence inhibition light 46 in the maxima 27. In other words, the intensity distribution 48 in FIG. 7 is depicted at a strongly reduced scale. Using the intensity distribution 50, it is possible to conclude from the fluorescence light 42 registered for the different positions of the local minimum 26 on the position of the individualized fluorescent marker emitting the fluorescence light 42. For this purpose, a spatial function having a local maximum in reproducing the intensity distribution 50 may be fitted to the intensities of the registered fluorescence light. The spatial function may also be determined by scanning the respective fluorescent marker or a similar fluorescent marker or a positioning aid of a same effective cross section with the local minimum 26 and registering the fluorescence light 42 emitted out of the sample.

Figure 8:
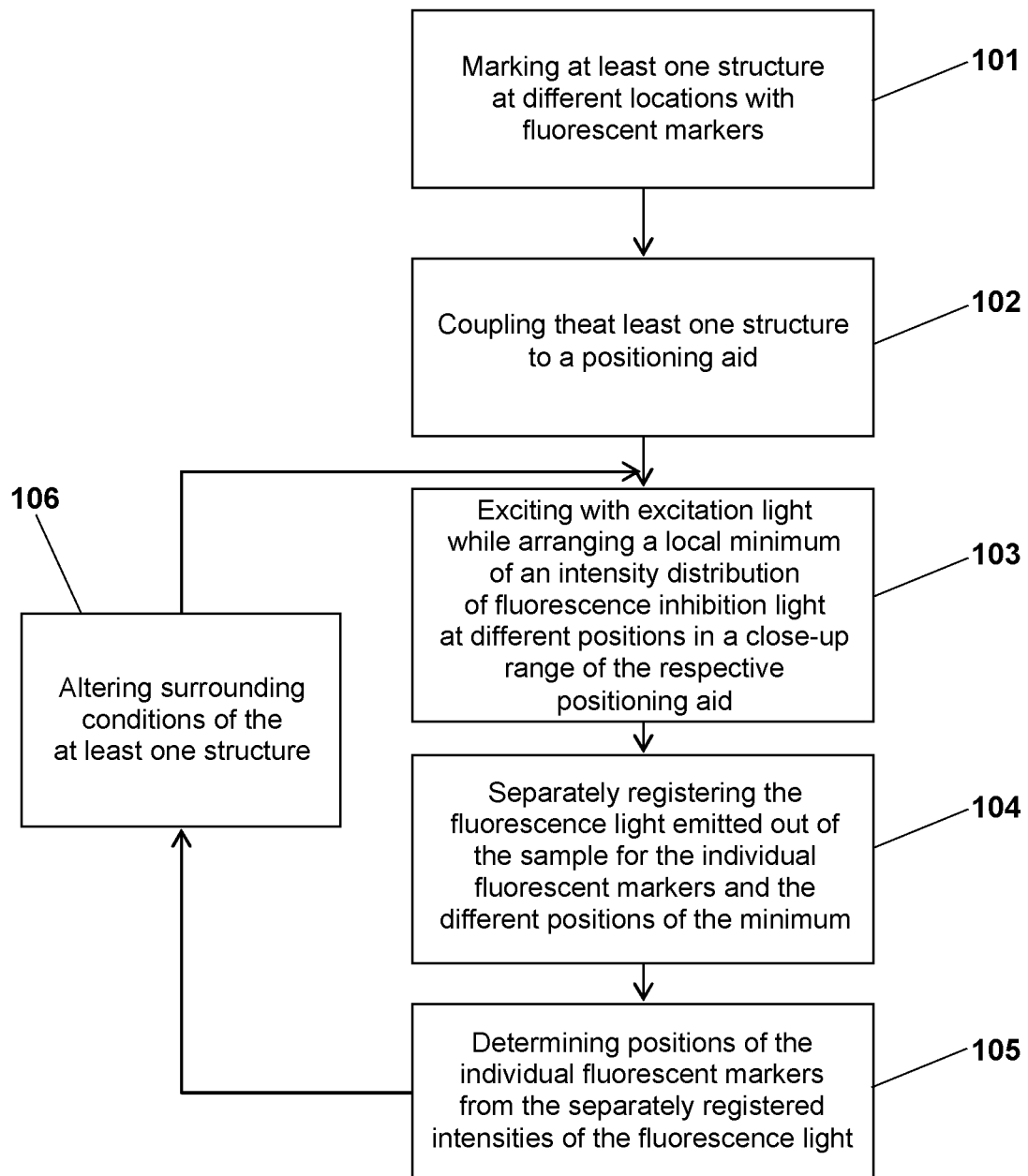
FIG. 8 is a flowchart of an embodiment of another aspect of the method according to the invention also using the intensity distributions according to FIG. 7.

In another aspect of the method according to the invention depicted in FIG. 8 in a flowchart, the same intensity distributions 24 and 48 are used which are illustrated in FIG. 7. In this other aspect, the method according to the invention starts with a step of marking 101 at least one nano-scale structure at different locations with fluorescent markers. This means that the at least one nano-scale structure is marked at each of at least two selected locations with one fluorescent marker. The fluorescent markers attached at the different locations of the at least one structure may be identical if they have an active and an inactive state between which they may be transferred, or they differ in their spectral properties with regard to at least one of the excitation light by which they are excitable for the emission of fluorescence light and the fluorescence light emitted by them following to the excitation.

A step of coupling 2 the at least one nano-scale structure to a positioning aids is shown in FIG. 1 as a step succeeding to the step of marking 101. The step of coupling 102 the at least one structure to the positioning aid may, however, precede the step of marking 1 the structures. Further, it is possible that the steps of marking 101 and coupling 102 are carried out simultaneously. Even further, the step of coupling 102 may even be avoided in this another aspect of the method according to the invention. If the step of coupling 102 is carried out, the at least one structure, after the steps of marking 101 and coupling 102, is marked several times and coupled to the positioning aid. The position of the positioning aid in a sample may either be known which implies that it is fixed, or it may be determinable from light which is reflected by the positioning aid because it, for example, includes a light reflecting particle selected from a gold or silver particle or a quantum dot. The determination of the position of the positioning aid may thus take place without stressing the fluorescent markers by excitation and emission of fluorescence light.

In a step of exciting 103 the fluorescence markers with excitation light for emission of fluorescence light while arranging a local minimum of an intensity distribution of fluorescence inhibition light at different positions in a close-up range of the positioning aid, the intensity distribution 24 of the excitation light 25 may have a maximum at the respective position of the local minimum of the intensity distribution 48 of the fluorescence inhibition light 46. If the local minimum of the intensity distribution of the fluorescence inhibition light and the maximum of the intensity distribution of the excitation light are together arranged in the close-up range of the respective positioning aid, the fluorescence markers which are in their active state and which may be excited by the excitation light emit fluorescence light. Here, the intensity of the fluorescence light depends on the distance of the respective fluorescence marker to the local minimum of the intensity distribution of the fluorescence inhibition light.

If a step of registering 104 the emitted fluorescence light is carried out such that the fluorescence light is separately registered for each of the fluorescence markers, because the fluorescence light from different fluorescence markers may be separated due to different wavelengths or because only one of the fluorescence markers is active, determining 105 the position of the individual fluorescence markers from the intensities of the fluorescence light from the respective fluorescence marker for the different positions of the minimum is possible. The precision of this step of determining 105, with a same number of photons of the fluorescence light registered, depends on how close the positions of the local minimum are already to the position of the respective fluorescence marker. In that the positions of the local minimum in the step of exciting 103 are arranged in a close-up range of the positioning aid in which the coupled structure and the attached fluorescence markers are also located, the relative precision in determining 105 the positions of the fluorescence markers depends on the dimensions of this close-up range.

If the position of the positioning aid is known very precisely, and if the step of coupling 102 the at least one structure to the positioning aids is carried out such that it has a maximum distance to the position of the positioning aid of the same order, the close-up range of the respective positioning aid in which the positions of the minimum are arranged may be correspondingly small. If the positions of all fluorescent markers with which the at least one structure is marked have been determined, the respective structure is measured. This measurement may be repeated after or during a step of altering 106 surrounding conditions of the at least one structure which is an optional step in this other aspect of the method according to the invention.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of spatially measuring a nano-scale structure in a sample, the method comprising the steps of:
   marking the structure at different locations with fluorescent markers,
   exciting the fluorescent markers with excitation light for emission of fluorescence light at the respective position of a local minimum of an intensity distribution of fluorescence inhibition light, wherein the local minimum is arranged at different positions in a close-up range in the sample whose dimensions are not larger than the diffraction limit at the wavelength of the excitation light and the wavelength of the fluorescence light,
   separately registering the fluorescence light emitted out of the sample for an individual fluorescent marker of the individual fluorescent markers and for the different positions of the minimum to obtain an intensity of the fluorescent light registered for the individual fluorescent marker for each of the different positions of the minimum, and
   determining positions of the individual fluorescent markers in the sample from the intensities of the fluorescence light registered for the respective fluorescent marker for the different positions of the minimum.

2. The method of claim 1, comprising, for spatially measuring a plurality of nano-scale structures including the nanoscale structure and further nano-scale structures in the sample:
   in the step of marking, individually marking the nanoscale structure and the further nano-scale structures of the plurality of nano-scale structures at different locations with fluorescent markers,
   individually coupling the nanoscale structure and the further nano-scale structures of the plurality of nano-scale structures to individual positioning aids whose positions in the sample are
   known or
   determined after the step of coupling from light reflected by the positioning aids, and
   in the step of exciting, arranging the local minimum at the different positions in a close-up range around the position of the respective positioning aid, dimensions of the close-up range not being larger than the diffraction limit at the wavelength of the excitation light and the wavelength of the fluorescence light.

3. The method of claim 2, wherein the dimensions of the close-up range are not larger than a half or a quarter of the diffraction limit at the wavelength of the excitation light and the wavelength of the fluorescence light.

4. The method of claim 2, wherein the positions of the individual fluorescent markers are determined from the intensities of the fluorescence light which are registered for not more than 4n or for not more than 3n or for not more than 2n different positions of the minimum, wherein n is the number of the spatial directions in which the positions of the individual fluorescent markers in the sample are determined.

5. The method of claim 4, wherein the step of determining the positions of the individual fluorescent markers in the sample includes fitting a spatial function comprising a local extremum to the intensities of the fluorescence light registered for the respective fluorescent marker for the different positions of the minimum.

6. The method of claim 5, wherein the spatial function comprising the local extremum is determined by scanning
   at least one of the light reflecting positioning aids or
   at least one of the fluorescent markers or
   a further fluorescent marker with the minimum and registering the light reflected out of the sample or the fluorescence light emitted out of the sample with temporal resolution while scanning.

7. The method of claim 2, wherein the fluorescent markers by which the individual structures are marked at different locations are selected from
   fluorescent markers that differ in spectral properties selected from excitation spectra and emission spectra of the fluorescent markers, and
   fluorescent markers that have an active state in which they are excitable with excitation light for emission of fluorescence light and an inactive state in which they are, at least with the same excitation light, not excitable for emission of fluorescence light, and that are transferable with switching light between their active and their inactive state.

8. The method of claim 2, wherein the positions of the positioning aids are approached with the local minimum by other means for relative movement of the minimum with regard to the sample than the means used for positioning the local minimum within the close-up ranges.

9. The method of claim 8, wherein the positions of the positioning aids are fixed relative to fixed points of the sample and that the positions of the positioning aids are approached relative to the fixed points of the sample.

10. The method of claim 2, wherein the positions of the positioning aids are arranged
    at minimum distances which are not smaller than twice the diffraction limit at the wavelength of the excitation light and the wavelength of the fluorescence light and
    in a predefined pattern in the sample selected from periodical, hexagonal and square patterns.

11. The method of claim 2, wherein the positioning aids in the sample are fixed coupling sites to which the nanoscale structure and further nano-scale structures are coupled via an immunoreaction.

12. The method of claim 2, wherein the positioning aids comprise light reflecting entities selected from gold particles, silver particles and quantum dots.

13. The method of claim 2, wherein nanoscale structure and further nano-scale the structures include equal structure, and wherein the equal structures are subjected to different surrounding conditions in different areas of the sample.

14. The method of claim 2, wherein the positions of the individual fluorescent markers in the sample are determined for at least two different points in time from the intensities of the fluorescence light registered for these at least two points in time, and wherein
    the nanoscale structure and further nano-scale structures are subjected to different surrounding conditions at the at least two points in time or
    the at least two points in time succeed to an alteration of the surrounding conditions to which nanoscale structure and further nano-scale the structures are subjected.

15. The method of claim 1, wherein an intensity distribution of the excitation light has a maximum at the respective position of the local minimum of the intensity distribution of the fluorescence inhibition light.

16. The method of claim 1, wherein the dimensions of the close-up range are
    not larger than a half or a quarter of the diffraction limit at the wavelength of the excitation light and the wavelength of the fluorescence light and
    not larger than a full width at half maximum or a half or a quarter of the full width at half maximum of a distribution of the intensity of the fluorescence light emitted by the respective fluorescent marker over its distance to the local minimum.

17. The method of claim 1, wherein the positions of the individual fluorescent markers are determined from intensities of the fluorescence light registered for not more than 4n or for not more than 3n or for not more than 2n different positions of the minimum, wherein n is the number of spatial directions in which the positions of the individual fluorescent markers in the sample are determined.

18. The method of claim 1, wherein the step of determining the positions of the individual fluorescent markers in the sample includes fitting a spatial function comprising a local maximum to the intensities of the fluorescence light registered for the respective fluorescent marker for the different positions of the minimum.

19. The method of claim 18, wherein the spatial function comprising the local maximum is determined both
    under scanning at least one of the fluorescent markers or of a further fluorescent marker with the minimum and registering the fluorescence light emitted out of the sample with temporal resolution while scanning, and
    under additionally scanning the at least one or the further fluorescent marker only with a maximum of the excitation light and registering the fluorescence light emitted out of the sample with temporal resolution while additionally scanning.

20. The method of claim 1, wherein the steps of exciting, registering and determining are repeated at least once with an increased intensity of the fluorescence inhibition light.

21. The method of claim 1, wherein the fluorescent markers with which the structure is marked at different locations are selected from
    fluorescent markers that differ in spectral properties selected from excitation spectra and emission spectra of the fluorescent markers, and
    fluorescent markers that have an active state in which they are excitable with excitation light for emission of fluorescence light and an inactive state in which they are, at least with the same excitation light, not excitable for emission of fluorescence light, and that are transferable with switching light between their active and their inactive state.

22. The method of claim 1, wherein the fluorescent markers are individualized prior to separately registering the fluorescence light emitted out of the sample for the individual fluorescent markers in that
    a part of the fluorescent markers is switched with switching light out of an active state of the fluorescent markers into an inactive state of the fluorescent markers or a part of the fluorescent markers is switched with switching light out of an inactive state of the fluorescence markers into an active state of the fluorescent markers.

23. The method of claim 1,
wherein the fluorescent markers are selected from fluorescent markers which are movable within the sample and which individually attach to the structure at different locations, and
wherein the fluorescent markers are added to the sample at such a concentration and in such a spatial distribution, that they one after the other individually attach to the structure, and
wherein
the fluorescent markers upon attaching to the structure are transferred out of an inactive state in which they are not excitable for emission of fluorescence light by the excitation light into an active state in which they are excitable for emission of fluorescence light by the excitation light or
the fluorescent markers only temporarily attach to the structure or
the fluorescent markers are permanently transferred into a dark state under long term influence of the excitation light and the fluorescence inhibition light.

24. The method of claim 1, additionally comprising the steps of:
exciting the fluorescent markers with excitation light for emission of fluorescence light, wherein the intensity distribution of the excitation light has another local minimum which is arranged at different positions in the sample,
registering the fluorescence light emitted out of the sample separately for the individual fluorescent markers and the different positions of the other minimum of the intensity distribution of the excitation light, and
determining the positions of the individual fluorescent markers in the sample from intensities of the fluorescence light registered for the respective fluorescent marker for the different positions of the other minimum of the intensity distribution of the excitation light.

25. The method of claim 24, wherein complementary intensity distributions of the fluorescence light emitted by the individual fluorescent markers out of the sample which, on the one hand, result over the different positions of the minimum of the intensity distribution of the fluorescence inhibition light and, on the other hand, over the different positions of the other minimum of the intensity distribution of the excitation light are compared in determining the positions of the individual fluorescent markers in the sample.

26. The method of claim 24,
wherein the positions of the individual fluorescent markers in the sample which are determined from the intensities of the fluorescence light registered for the respective fluorescent marker for the different positions of the minimum of the intensity distribution of the fluorescence inhibition light are considered in defining the positions at which afterwards the other minimum of the intensity distribution of the excitation light is arranged, or
wherein the positions of the individual fluorescent markers in the sample which are determined from the intensities of the fluorescence light registered for the respective fluorescent marker for the different positions of the other minimum of the intensity distribution of the excitation light are considered in defining the positions at which afterwards the minimum of the intensity distribution of the fluorescence inhibition light is arranged.

\* \* \* \* \*